(12) United States Patent
Gupta et al.

(10) Patent No.: US 12,099,154 B2
(45) Date of Patent: Sep. 24, 2024

(54) DIGITAL SEISMIC FILE SCANNER

(71) Applicant: Schlumberger Technology Corporation, Sugar Land, TX (US)

(72) Inventors: Rishabh Gupta, Pune (IN); Svapanil Patel, Pune (IN); Udit Sinha, Brisbane (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/556,432

(22) PCT Filed: Apr. 20, 2022

(86) PCT No.: PCT/US2022/025491
§ 371 (c)(1),
(2) Date: Oct. 20, 2023

(87) PCT Pub. No.: WO2022/226030
PCT Pub. Date: Oct. 27, 2022

(65) Prior Publication Data
US 2024/0184009 A1    Jun. 6, 2024

(30) Foreign Application Priority Data

Apr. 21, 2021 (IN) .............................. 202121018479

(51) Int. Cl.
*G01V 1/36* (2006.01)
(52) U.S. Cl.
CPC ........ *G01V 1/362* (2013.01); *G01V 2210/512* (2013.01); *G01V 2210/514* (2013.01)

(58) Field of Classification Search
CPC ............. G01V 1/362; G01V 2210/512; G01V 2210/514
See application file for complete search history.

(56) References Cited

U.S. PATENT DOCUMENTS

| | | |
|---|---|---|
| 2006/0212761 A1 | 9/2006 | Levine et al. |
| 2012/0059592 A1 | 3/2012 | Chevion et al. |
| 2016/0282489 A1 | 9/2016 | Al-Dossary et al. |

FOREIGN PATENT DOCUMENTS

| | | | | |
|---|---|---|---|---|
| WO | 2020186234 A1 | 9/2020 | | |
| WO | WO-2022150838 A1 | * 7/2022 | ............. | G06F 40/30 |
| WO | WO-2022226030 A1 | * 10/2022 | ............. | G01V 1/247 |

OTHER PUBLICATIONS

Raykova et al.; "Review of digital formats for exchange and processing of seismological data"; Bulgarian Geophysical Journal, 2000, V.26, 1-4; Jan. 2000; 17 pages.

(Continued)

*Primary Examiner* — Daniel Pihulic
(74) *Attorney, Agent, or Firm* — Michael Guthrie

(57) ABSTRACT

A method includes obtaining a digital seismic file, performing autodetection of parameters of the digital seismic file, and registering the parameters of the digital seismic file with the digital seismic file. Performing autodetection comprises a computer processor, repetitively until a candidate template successfully extracts the parameters, selecting a target candidate template, attempting extraction of a binary header using the target candidate template, attempting extraction of a trace header using the target candidate template, attempting extraction of the plurality of parameters when the target candidate template extracts the binary header and the trace header, and moving to a next target candidate template when extraction of the plurality of headers is unsuccessful.

20 Claims, 14 Drawing Sheets

(56) References Cited

OTHER PUBLICATIONS

PCT International Search Report and Written Opinion; Application No. PCT/US2022/025491; Dated Jul. 28, 2022; 10 pages.

* cited by examiner

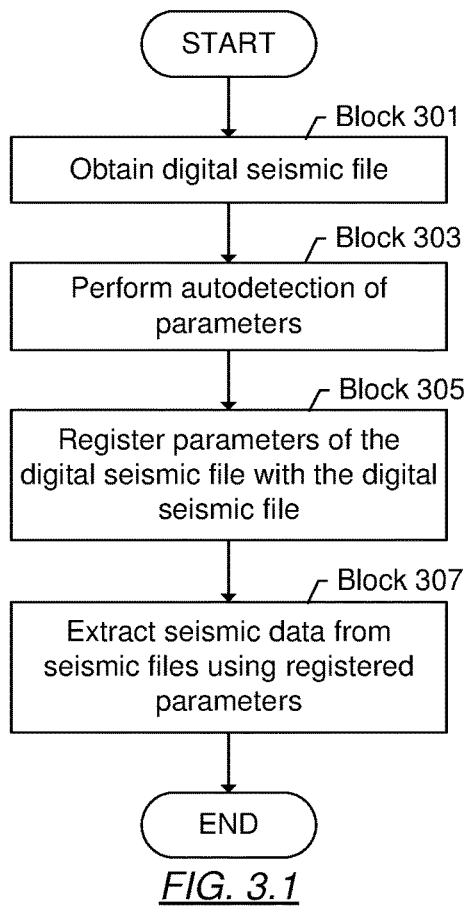
FIG. 3.1
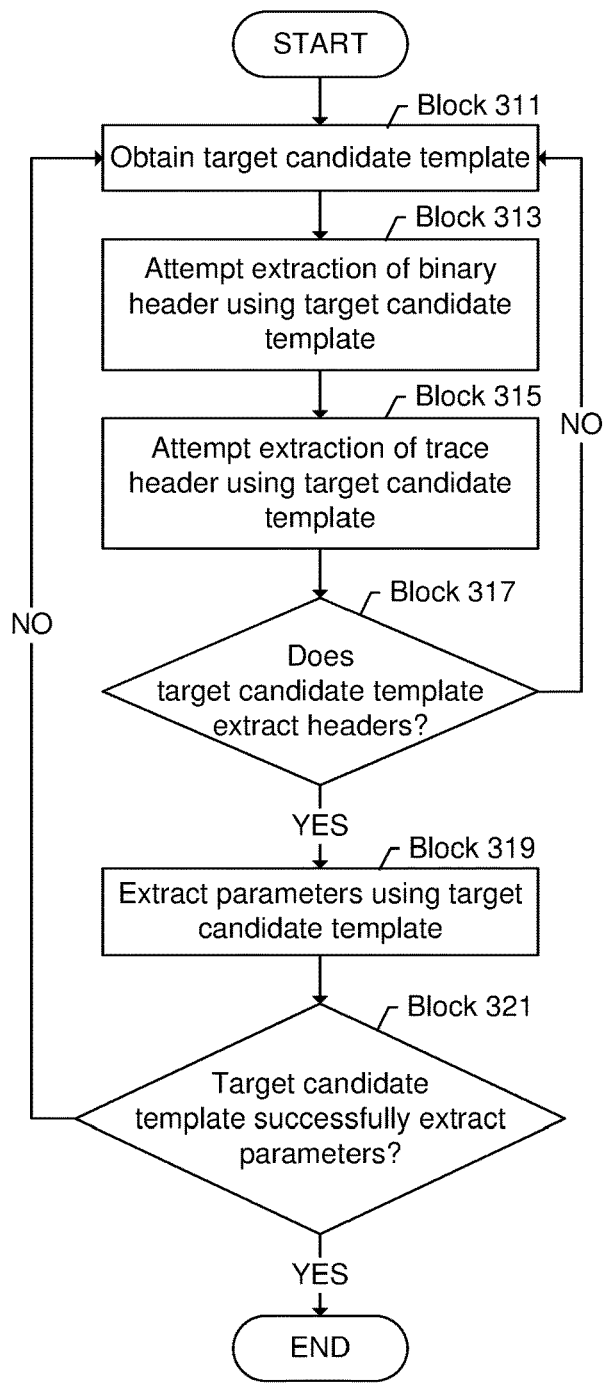
FIG. 3.2

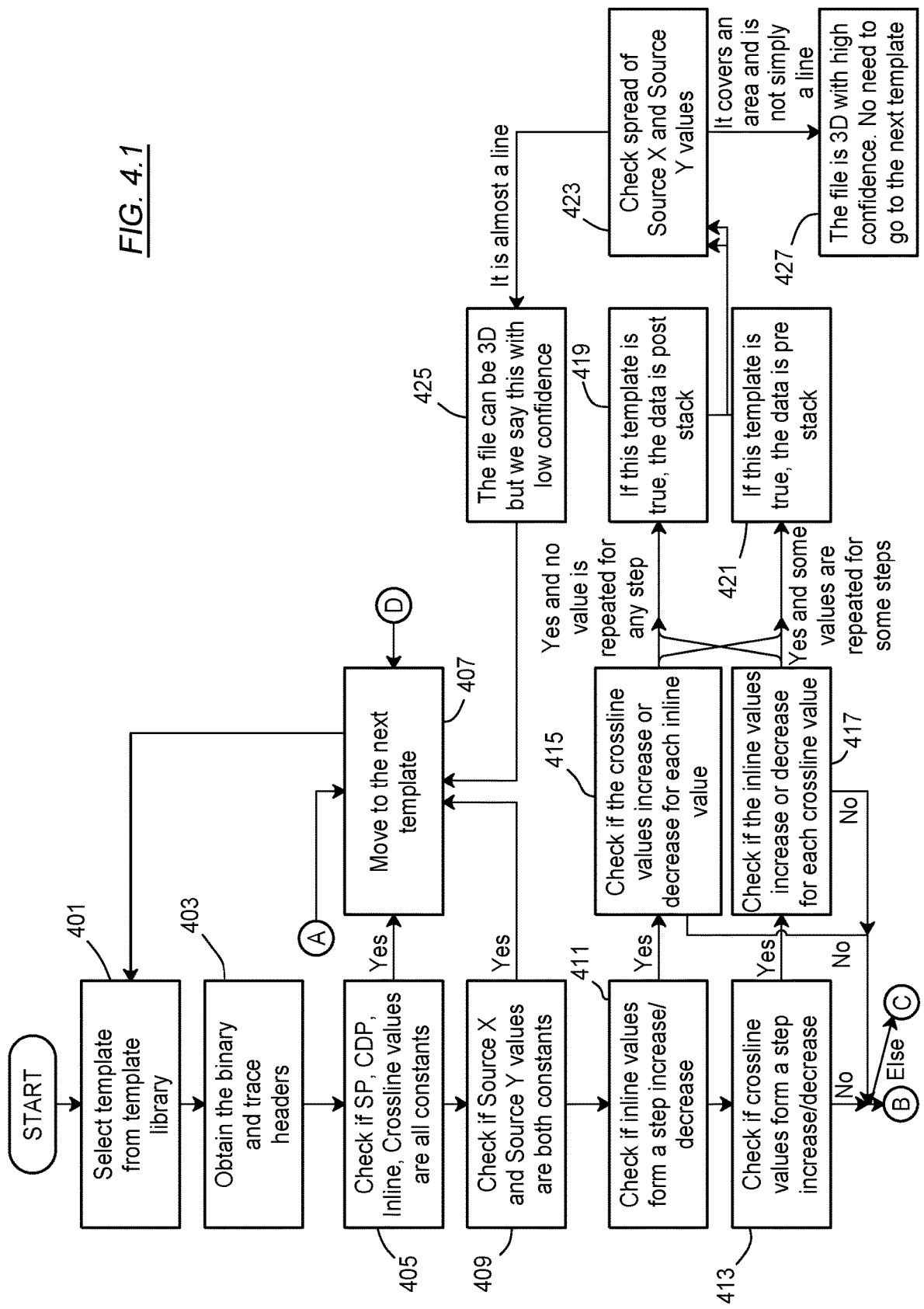
FIG. 4.1

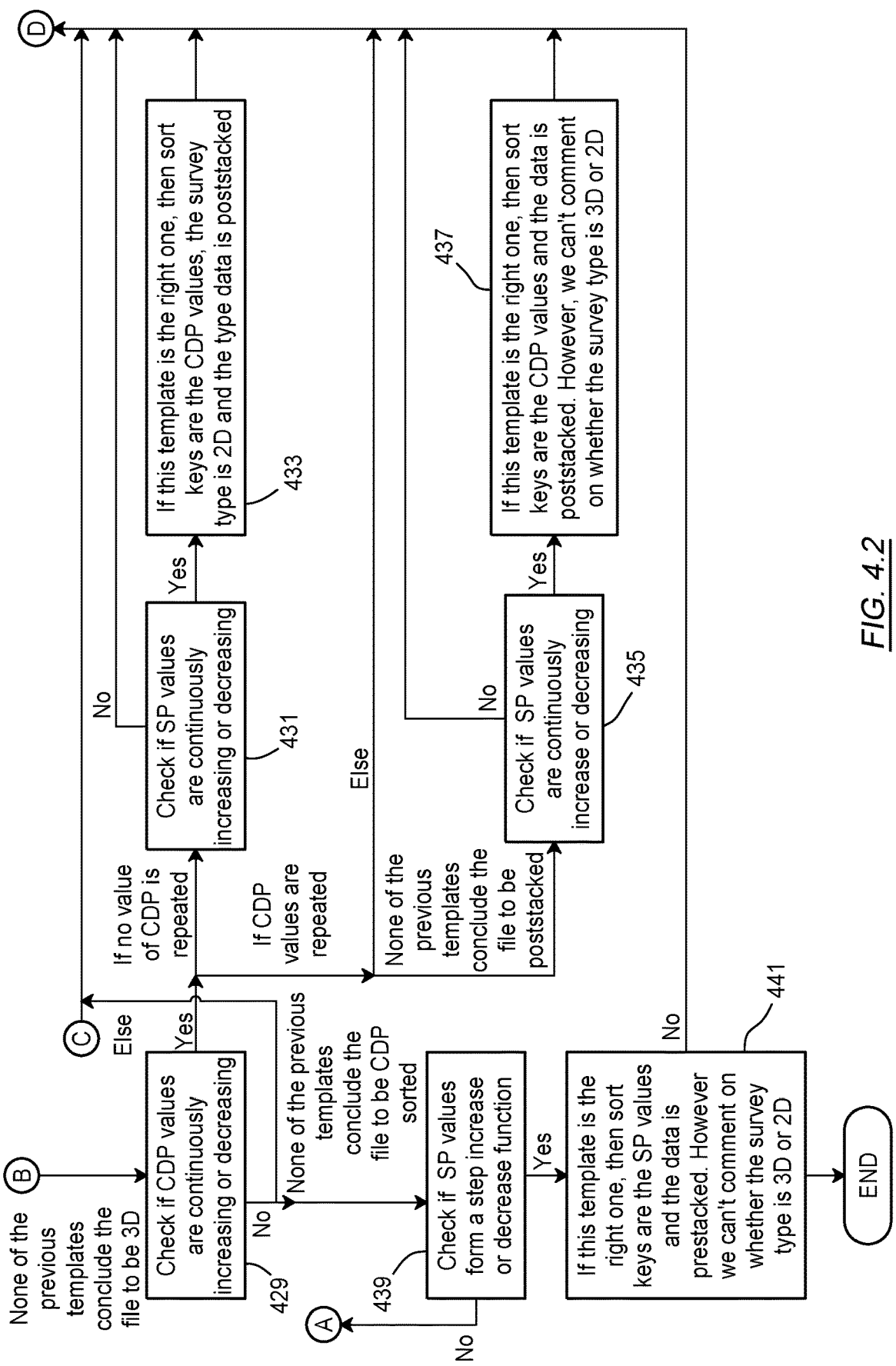
FIG. 4.2

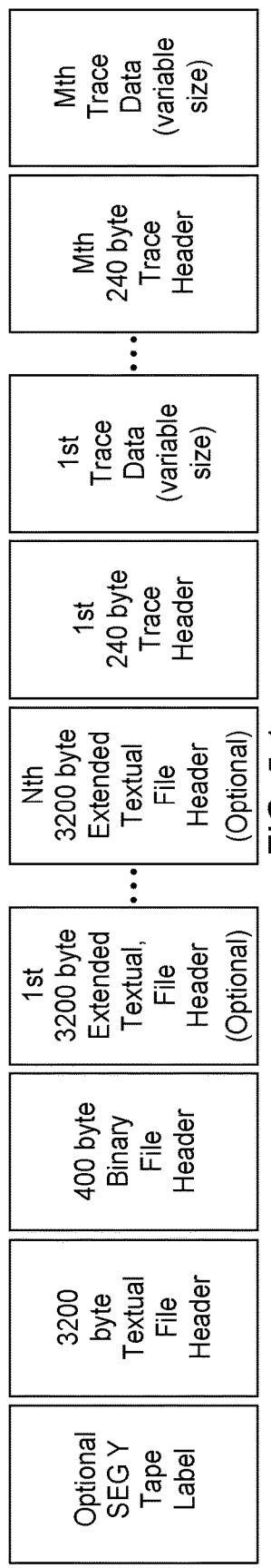
FIG. 5.1
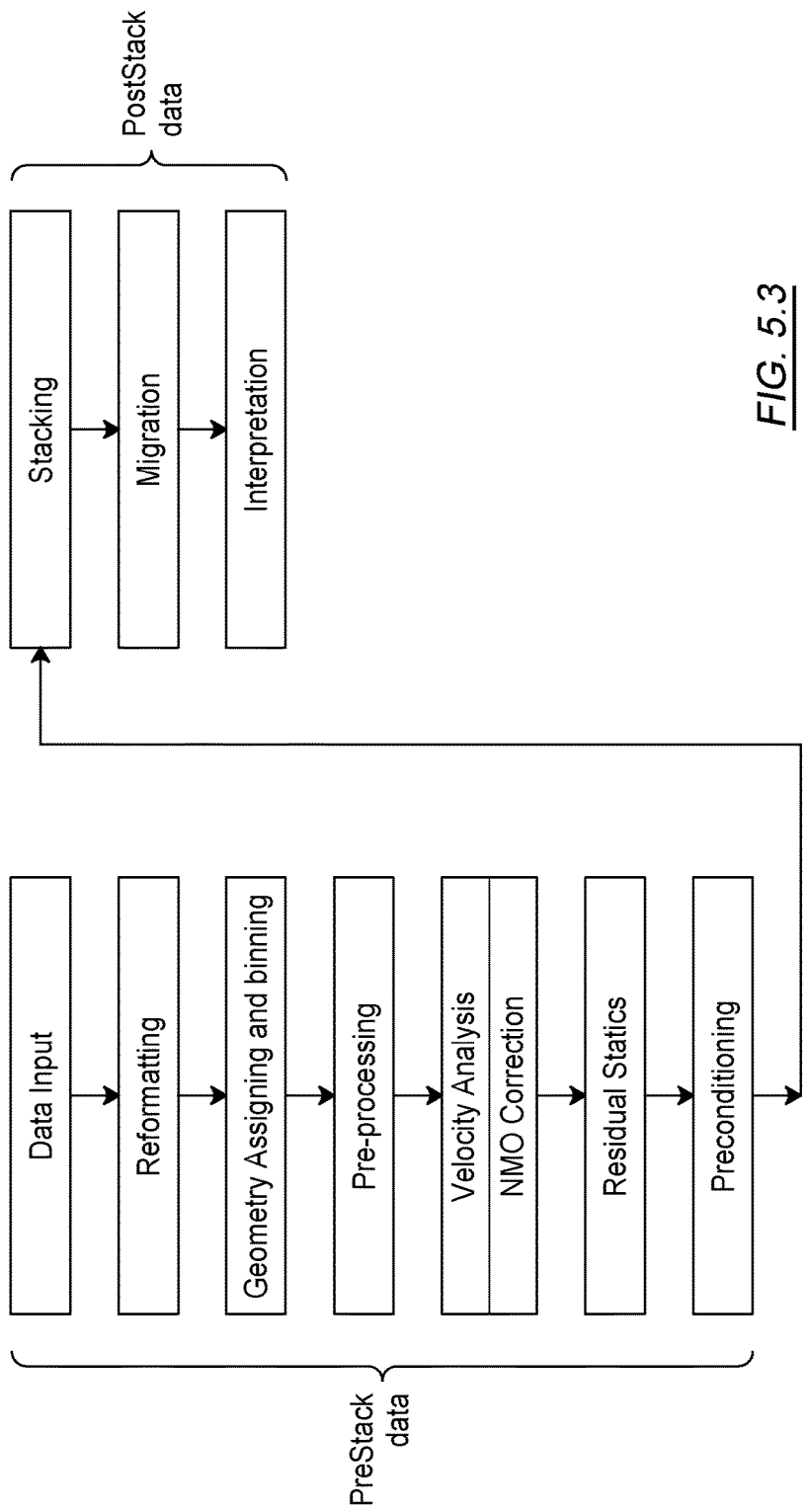
FIG. 5.3

| TWSGYFMT : V1.0 | | | | |
|---|---|---|---|---|
| "IN LINE " | 189 | 4 | " " | "32-BIT " | TRACE |
| "CROSS LINE " | 193 | 4 | " " | "32-BIT " | TRACE |
| "SX " | 73 | 4 | " " | "32-BIT " | TRACE |
| "SY " | 77 | 4 | " " | "32-BIT " | TRACE |
| "X CO-ORDINATE OF CDP " | 181 | 4 | " " | "32-BIT " | TRACE |
| "Y CO-ORDINATE OF CDP " | 185 | 4 | " " | "32-BIT " | TRACE |
| "SHOT POINT " | 17 | 4 | " " | "32-BIT " | TRACE |
| "CDP " | 21 | 4 | " " | "32-BIT " | TRACE |
| "TRACE NO " | 1 | 4 | " " | "32-BIT " | TRACE |
| "REEL TRACE NO " | 5 | 4 | " " | "32-BIT " | TRACE |
| "FIELD NO " | 9 | 4 | " " | "32-BIT " | TRACE |
| "FIELD TRACE NO " | 13 | 4 | " " | "32-BIT " | TRACE |
| "CDP TRACE NO " | 25 | 4 | " " | "32-BIT " | TRACE |
| "TRACE CODE " | 29 | 2 | " " | "16-BIT " | TRACE |
| "VER. SUMMED TRACES " | 31 | 2 | " " | "16-BIT " | TRACE |
| "HOR. STACKED TRACES " | 33 | 2 | " " | "16-BIT " | TRACE |
| "DATA USE " | 35 | 2 | " " | "16-BIT " | TRACE |
| "SOURCE TO RECEIVER DISTANCE " | 37 | 4 | " " | "32-BIT " | TRACE |
| "RECEIVER GROUP ELEVATION " | 41 | 4 | " " | "32-BIT " | TRACE |
| "SURFACE ELEVATION AT SOURCE " | 45 | 4 | " " | "32-BIT " | TRACE |
| "SOURCE DEPTH BELOW SURFACE " | 49 | 4 | " " | "32-BIT " | TRACE |
| "DATUM ELEVATION AT RECEIVER GROUP " | 53 | 4 | " " | "32-BIT " | TRACE |
| "DATUM ELEVATION AT SOURCE " | 57 | 4 | " " | "32-BIT " | TRACE |
| "WATER DEPTH AT SOURCE " | 61 | 4 | " " | "32-BIT " | TRACE |
| "WATER DEPTH AT GROUP " | 65 | 2 | " " | "16-BIT " | TRACE |
| "SCALAR FOR ELEVATION & DEPTH " | 69 | 2 | " " | "16-BIT " | TRACE |
| "XY SCALER " | 71 | 2 | " " | "16-BIT " | TRACE |
| "GX " | 81 | 4 | " " | "32-BIT " | TRACE |
| "GY " | 85 | 4 | " " | "32-BIT " | TRACE |

*FIG. 5.2*

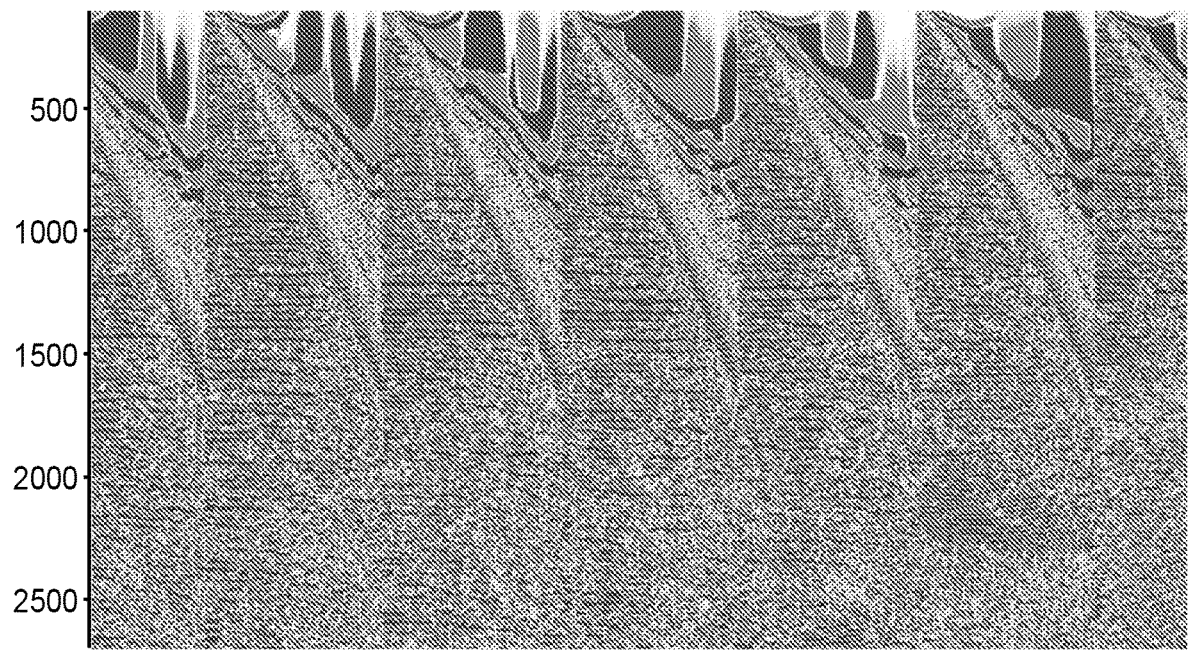
FIG. 5.4
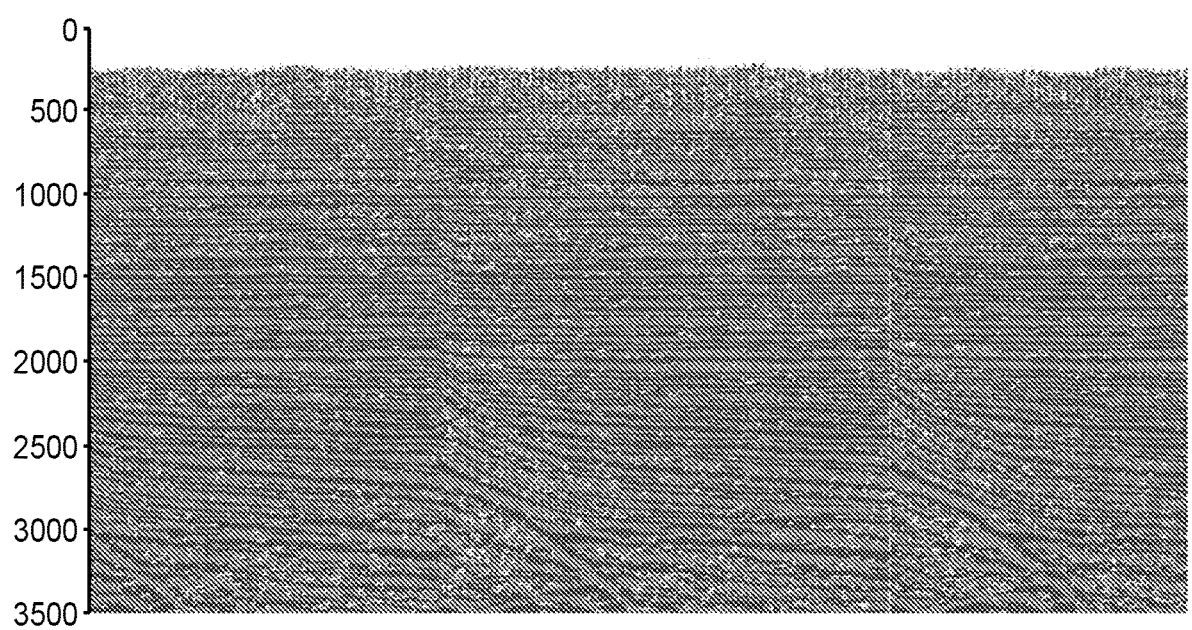
FIG. 5.5

| Value | Description | Bytes |
|---|---|---|
| 0 | Job identification number | 1 - 4 |
| 514 | * Line number | 5 - 8 |
| 0 | * Reel number | 9 - 12 |
| 480 | * # data traces per record | 13 - 14 |
| 0 | * # aux traces per record | 15 - 16 |
| 2000 | * Sample interval (microseconds) for reel | 17 - 18 |
| 0 | Sample interval (microseconds) for field | 19 - 20 |

*FIG. 5.6*

| Value | Description | Bytes |
|---|---|---|
| 0 | * Reel number | 9 - 12 |
| 1 | * # data traces per record | 13 - 14 |
| 0 | * # aux traces per record | 15 - 16 |
| 4000 | * Sample interval (microseconds) for reel | 17 - 18 |
| 0 | Sample interval (microseconds) for field | 19 - 20 |
| 876 | * Number samples per data trace for reel | 21 - 22 |
| 0 | Number samples per data trace for field | 23 - 24 |

*FIG. 5.7*

| Value | Description | Bytes |
|---|---|---|
| 500 | * Line number | 5 - 8 |
| 0 | * Reel number | 9 - 12 |
| 1 | * # data traces per record | 13 - 14 |
| 0 | * # aux traces per record | 15 - 16 |
| 4000 | * Sample interval (microseconds) for reel | 17 - 18 |
| 0 | Sample interval (microseconds) for field | 19 - 20 |
| 876 | * Number samples per data trace for reel | 21 - 22 |
| 0 | Number samples per data trace for field | 23 - 24 |
| 1 | * Data sample format code | 25 - 26 |
| 1 | * CDP fold | 27 - 28 |

*FIG. 5.8*

| Value | Description | Bytes |
|---|---|---|
| 0 | Job identification number | 1 - 4 |
| 0 | * Line number | 5 - 8 |
| 0 | * Reel number | 9 - 12 |
| 240 | * # data traces per record | 13 - 14 |
| 0 | * # aux traces per record | 15 - 16 |
| 4000 | * Sample interval (microseconds) for reel | 17 - 18 |
| 0 | Sample interval (microseconds) for field | 19 - 20 |
| 1501 | * Number samples per data trace for reel | 21 - 22 |
| 0 | Number samples per data trace for field | 23 - 24 |
| 1 | * Data sample format code | 25 - 26 |
| 240 | * CDP fold | 27 - 28 |

*FIG. 5.9*

| Trace # | SP | CDP | SRCX | SRCY | CDP-X | CDP-Y | INLINE # |
|---|---|---|---|---|---|---|---|
| 1 | 16864 | 44230556 | 0 | 0 | 0 | 0 | 10494 |
| 2 | 16864 | 44242557 | 0 | 0 | 0 | 0 | 10496 |
| 3 | 16864 | 44254558 | 0 | 0 | 0 | 0 | 10498 |
| 4 | 16864 | 44266559 | 0 | 0 | 0 | 0 | 10500 |
| 5 | 16864 | 44278560 | 0 | 0 | 0 | 0 | 10502 |
| 6 | 16864 | 44290561 | 0 | 0 | 0 | 0 | 10504 |
| 7 | 16864 | 44302562 | 0 | 0 | 0 | 0 | 10506 |
| 8 | 16864 | 44302562 | 0 | 0 | 0 | 0 | 10506 |
| 9 | 16864 | 44314563 | 0 | 0 | 0 | 0 | 10508 |
| 10 | 16864 | 44314563 | 0 | 0 | 0 | 0 | 10508 |
| 11 | 16864 | 44326564 | 0 | 0 | 0 | 0 | 10510 |
| 12 | 16864 | 44326564 | 0 | 0 | 0 | 0 | 10510 |
| 13 | 16864 | 44338565 | 0 | 0 | 0 | 0 | 10512 |
| 14 | 16864 | 44338565 | 0 | 0 | 0 | 0 | 10512 |
| 15 | 16864 | 44350566 | 0 | 0 | 0 | 0 | 10514 |
| 16 | 16864 | 44350566 | 0 | 0 | 0 | 0 | 10514 |
| 17 | 16864 | 44362567 | 0 | 0 | 0 | 0 | 10516 |
| 18 | 16864 | 44362567 | 0 | 0 | 0 | 0 | 10516 |
| 19 | 16864 | 44374568 | 0 | 0 | 0 | 0 | 10518 |
| 20 | 16864 | 44374568 | 0 | 0 | 0 | 0 | 10518 |
| 21 | 16864 | 44386569 | 0 | 0 | 0 | 0 | 10520 |
| 22 | 16864 | 44398570 | 0 | 0 | 0 | 0 | 10522 |
| 23 | 16864 | 44410571 | 0 | 0 | 0 | 0 | 10524 |
| 24 | 16864 | 44422572 | 0 | 0 | 0 | 0 | 10526 |
| 25 | 16864 | 44434573 | 0 | 0 | 0 | 0 | 10528 |
| 26 | 16864 | 44446574 | 0 | 0 | 0 | 0 | 10530 |
| 27 | 16864 | 44458575 | 0 | 0 | 0 | 0 | 10532 |
| 28 | 16864 | 44458575 | 0 | 0 | 0 | 0 | 10532 |
| 29 | 16864 | 44470576 | 0 | 0 | 0 | 0 | 10534 |
| 30 | 16864 | 44482577 | 0 | 0 | 0 | 0 | 10536 |
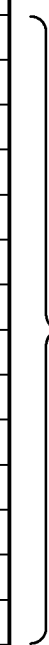
*FIG. 5.10*

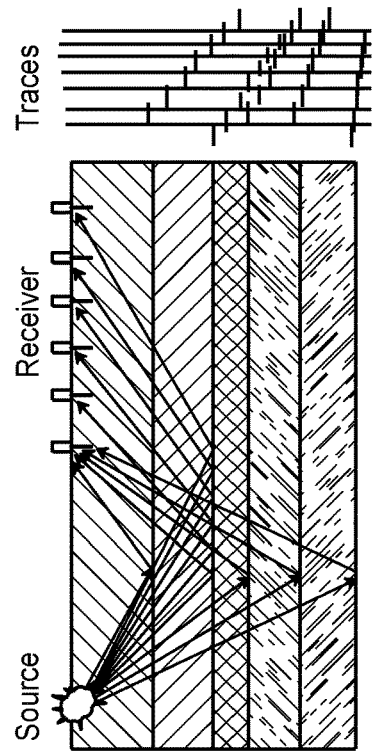
FIG. 5.12
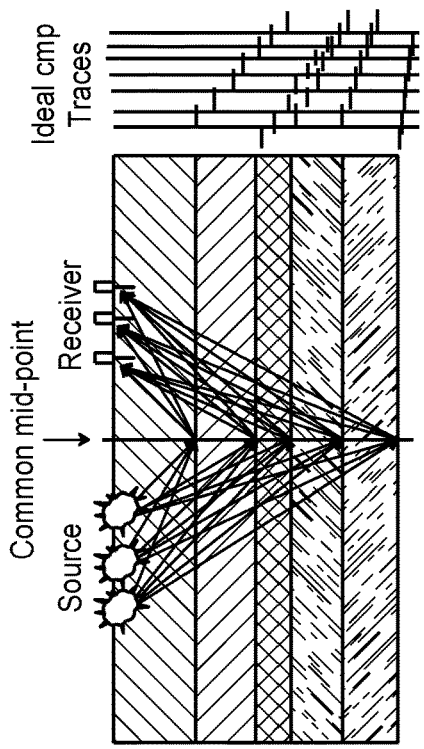
FIG. 5.11
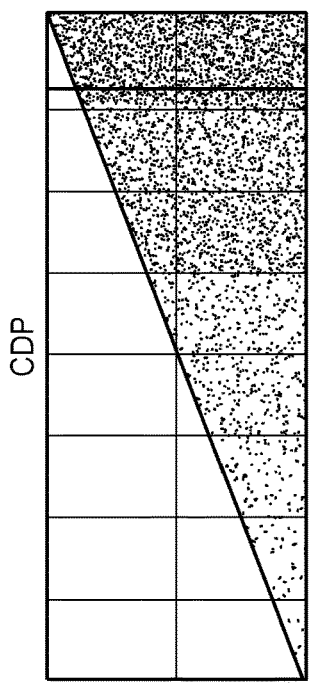
FIG. 5.13
```
Trace sorting code (i.e. type of ensemble) :
-1 = Other (should be explained in user Extended Textual
     File Header stanza
 0 = Unknown
 1 = As recorded (no sorting)
 2 = CDP ensemble
 3 = Single fold continuous profile
 4 = Horizontally stacked
 5 = Common source point
 6 = Common receiver point
 7 = Common offset point
 8 = Common mid-point
 9 = Common conversion point
```
3229-3230[7]
FIG. 5.14

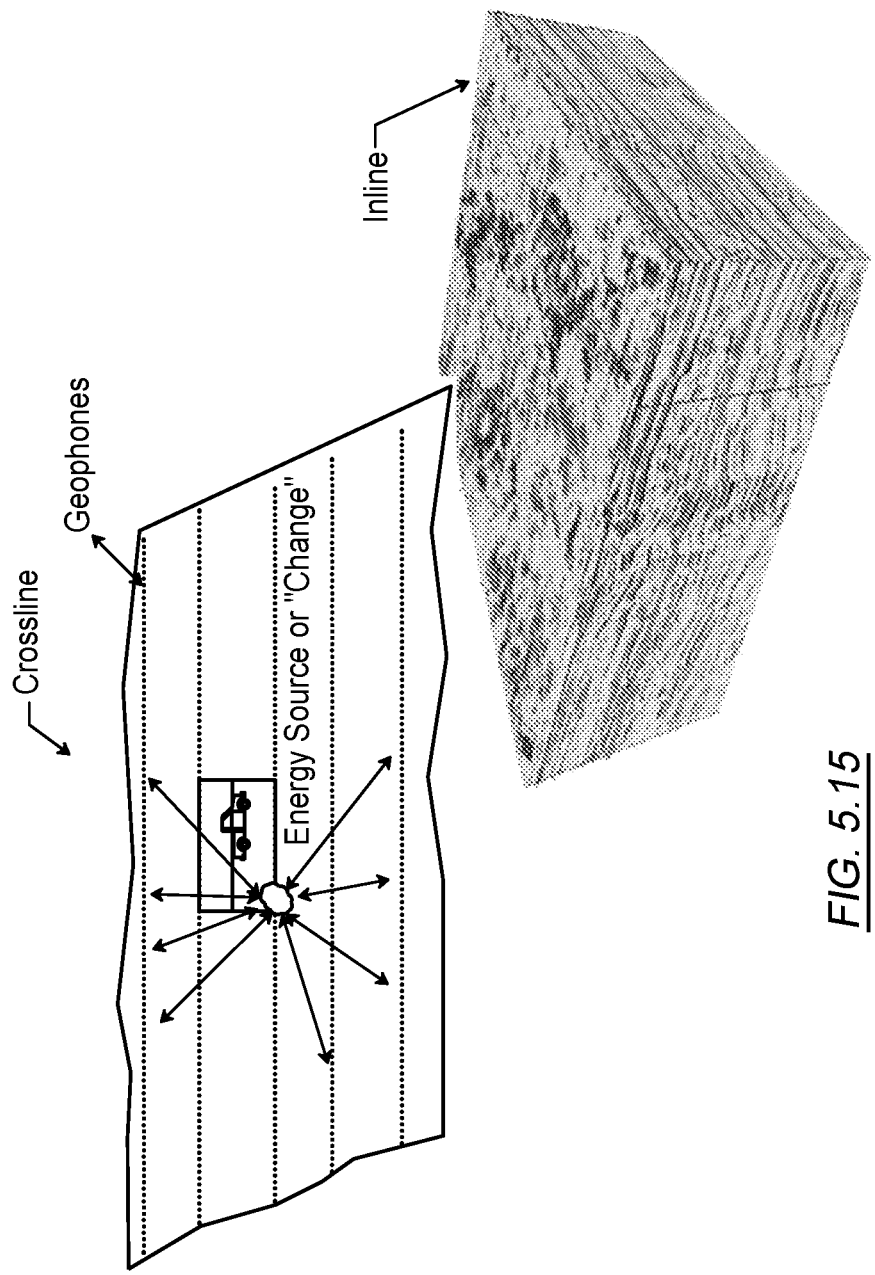
FIG. 5.15

| Type | PostStack | PreStack |
|------|-----------|----------|
| 3D | Inline, Xline | Inline, Xline, CMP, FF |
| 2D | CDP | SP, CDP, FF |
*FIG. 5.16*
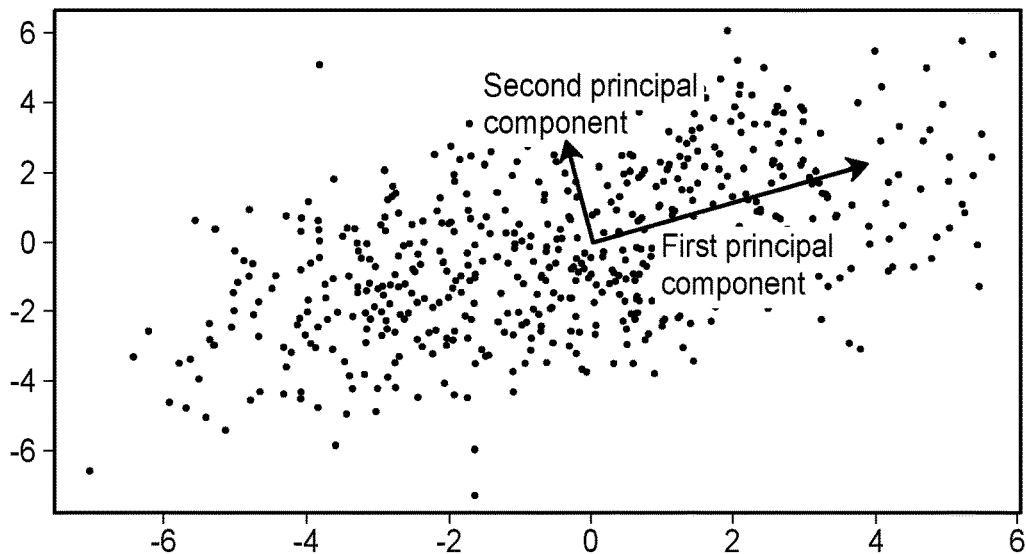
*FIG. 5.17*
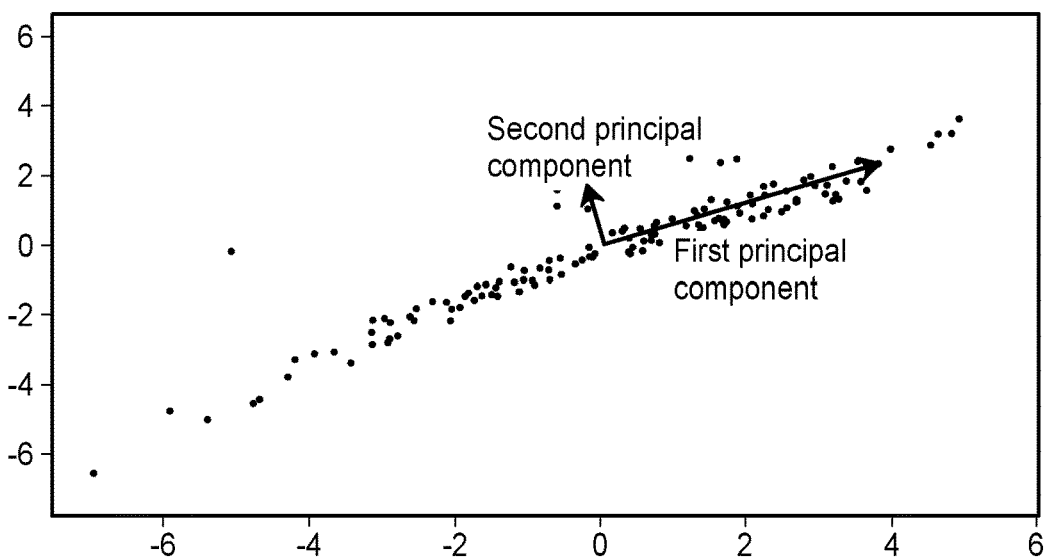
*FIG. 5.18*

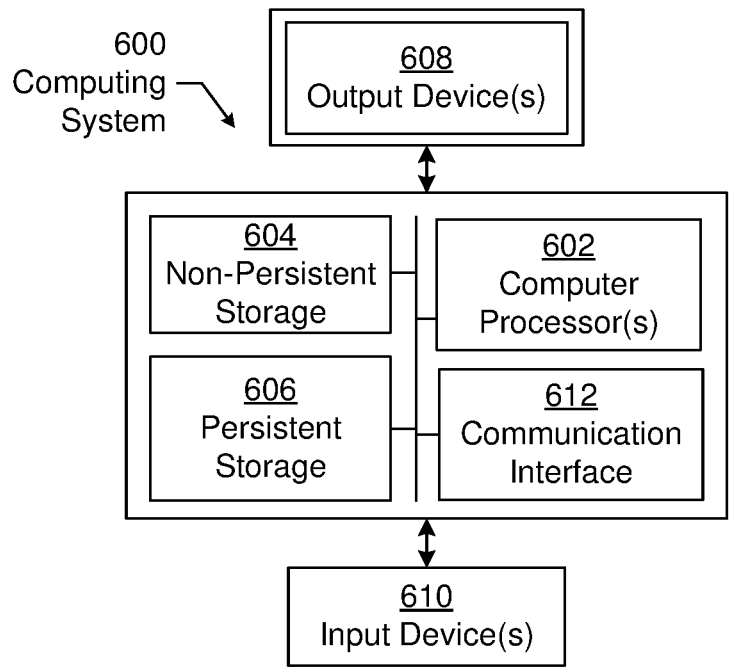
*FIG. 6.1*
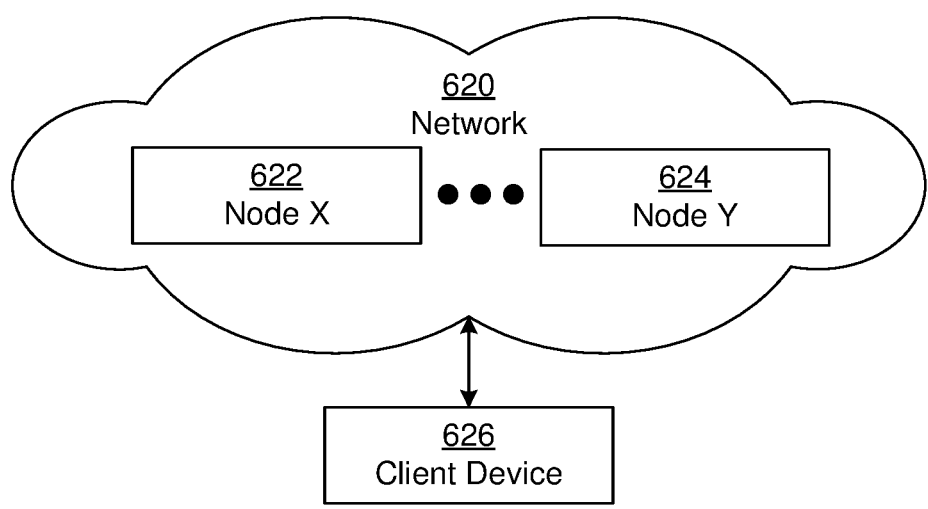
*FIG. 6.2*

DIGITAL SEISMIC FILE SCANNER

CROSS-REFERENCE TO RELATED APPLICATIONS

The present application claims priority benefit of Indian Patent Application No. 202121018479, filed Apr. 21, 2021, the entirety of which is incorporated by reference herein and should be considered part of this specification.

BACKGROUND

In the oil and gas industry along with other industries, seismic surveys are performed to determine subterranean formations. For example, the seismic surveys may be used to determine possible locations of hydrocarbons. Seismic surveys involve initiating a seismic wave at a first location and detecting refracted impulses at one or more seismic detector. The amplitude and time of the refracted impulses are indicative of subterranean structures and resources. A digitally formatted seismic file (i.e., digital seismic file) is created as a result of a seismic survey. To use the seismic surveys, the digital seismic file is loaded into a software application. To load the seismic survey, parameters of the digital seismic files are extracted. The parameters not only include the data format and file parameters, but also relate to the structure of seismic data within the digital seismic file.

Over time, large volumes of digital seismic files are created. Different acquisition tools and different software packages have different formats and structures. Thus, to load the large volumes, the individual parameters of the different digital seismic files need to be determined from the large volumes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Digital seismic file scanning includes obtaining a digital seismic file, performing autodetection of parameters of the digital seismic file, and registering the parameters of the digital seismic file with the digital seismic file. Performing autodetection includes a computer processor, repetitively until a candidate template successfully extracts the parameters, selecting a target candidate template, attempting extraction of a binary header using the target candidate template, attempting extraction of a trace header using the target candidate template, attempting extraction of the plurality of parameters when the target candidate template extracts the binary header and the trace header, and moving to a next target candidate template when extraction of the plurality of headers is unsuccessful.

Other aspects of the disclosure will be apparent from the following description and the appended claims.

BRIEF DESCRIPTION OF DRAWINGS

FIGS. 3.1 and 3.2 show flowcharts in accordance with disclosed embodiments.

FIGS. 4.1 and 4.2 show an example detailed flowchart in accordance with disclosed embodiments.

FIGS. 5.1, 5.2, 5.3, 5.4, 5.5, 5.6, 5.7, 5.8, 5.9, 5.10, 5.11, 5.12, 5.13, 5.14, 5.15, 5.16, 5.17, and 5.18 shows an example in accordance with one or more embodiments of the disclosure.

FIGS. 6.1 and 6.2 show computing systems in accordance with disclosed embodiments.

DETAILED DESCRIPTION

Figure 1:
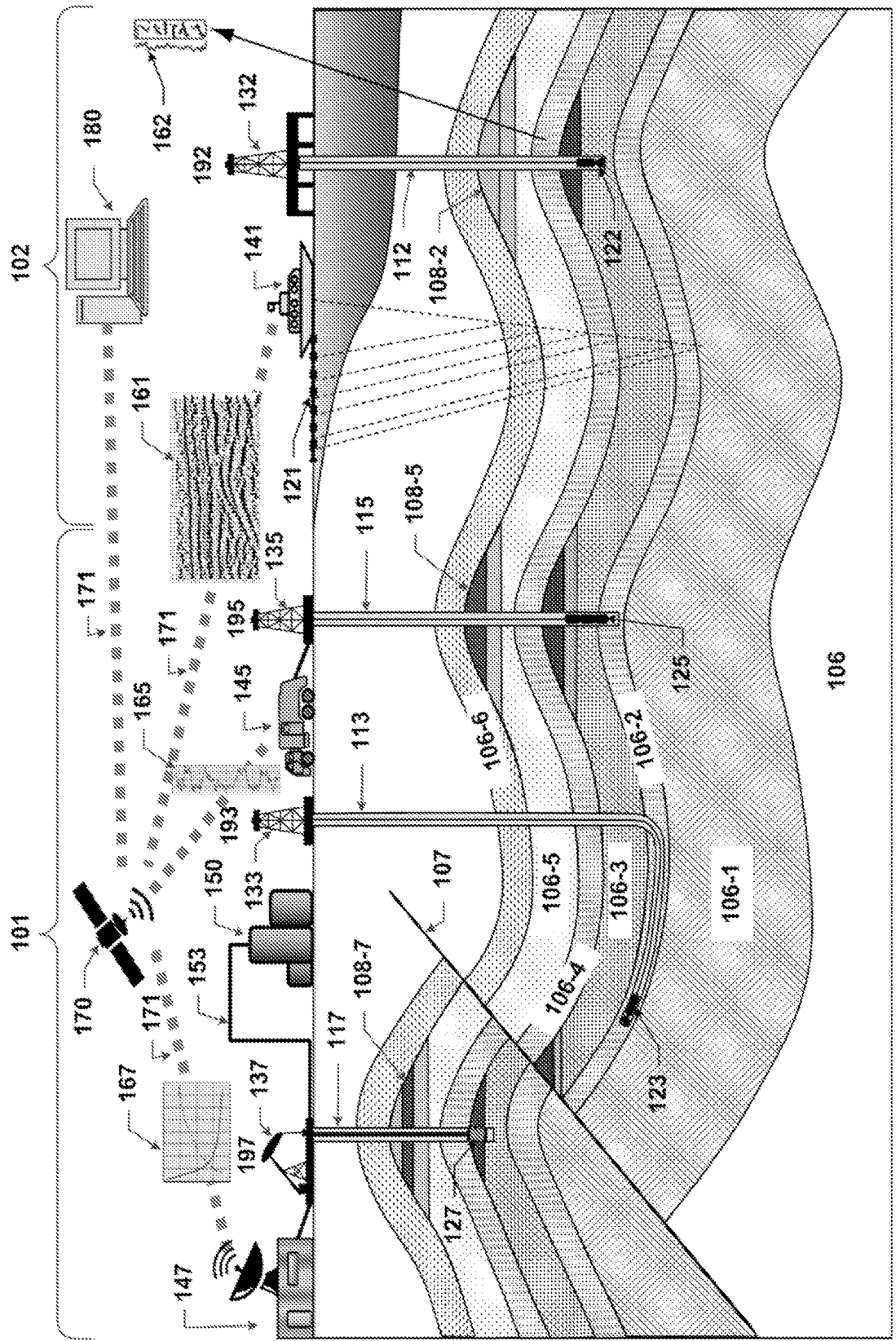
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Seismic survey operations are used to explore subterranean formations. The result of seismic survey operations is the generation of a digital seismic file. To be useful, a software application needs to interpret seismic data in the digital seismic file. However, different types of seismic surveying tools and software acquisition packages exist. Each of the different types of seismic surveying tools and software acquisition packages may have different mechanisms for storing the seismic data. For example, the different mechanisms may relate to the ordering and sorting of seismic values, number of dimensions (e.g., whether two dimensional or three dimensional), stacking type, survey type, whether inline or crossline sorted, whether common reflective surface (CRS) is used, quality of seismic data, etc.

The different mechanisms are the parameters of the digital seismic file. The parameters may be explicitly stored in the digital seismic file, implicitly stored, or be extrapolated from the particular seismic values in the digital seismic file. The parameters not only include the data format and file parameters, but also relate to the structure of seismic data within the seismic survey file.

To interpret the seismic data, the software application needs to be provided with the parameters of the digital seismic file. Over time, large volumes of digital formatted files are created. One or more embodiments are directed to extracting parameters from a digital seismic file and registering the parameters. The parameters may then be used to extract seismic data from the digital seismic file.

As discussed above, embodiments relate to digital seismic files generated through the various exploration and production (E&P) operations of an oilfield. FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water, or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest. The various plots and seismic surveys may be saved as oilfield document files by the various components of FIG. 1.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other terms, the seismic source, and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6). The data acquisition tools, and software applications connected thereto may generate oilfield document files from the seismic data and other oilfield data, which are then stored in the system.

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit. Field operations are stored in document files as production data.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud-based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 6.1 and 6.2 and described below. The various parts of the E&P computer system may also generate and store various oilfield document files.

Figure 2:
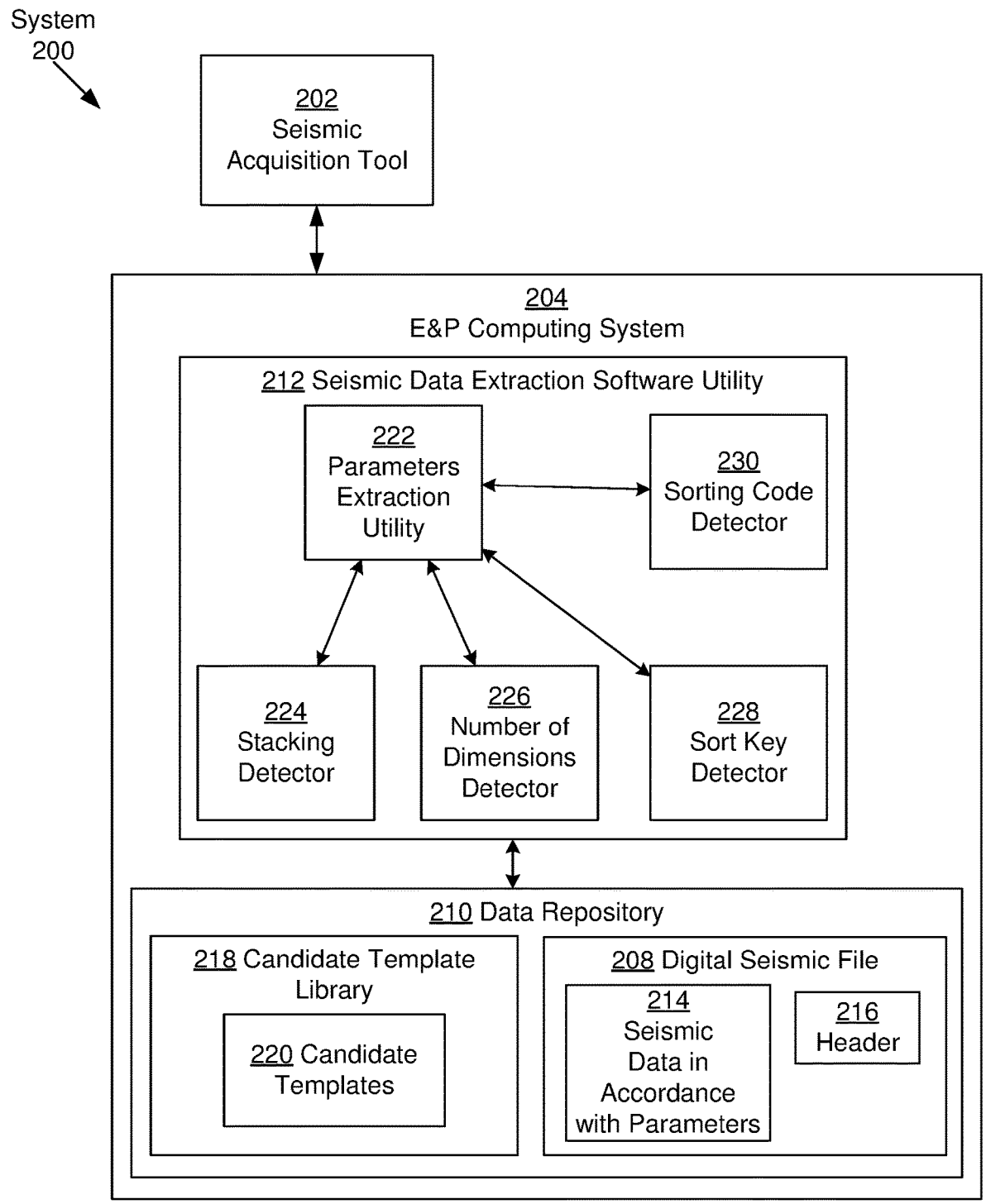
FIG. 2 shows a diagram of an E&P computer system in accordance with disclosed embodiments.

FIG. 2 shows a system (200) in accordance with one or more embodiments of the disclosure. As shown in FIG. 2, the system (200) includes at least one seismic acquisition tool (202) connected to an E&P computing system (204). The seismic acquisition tool (202) includes one or more of the components of the field equipment shown in FIG. 1, such as one or more transmitter and one or more receiver equipment and seismic acquisition software. The seismic acquisition tool (202) oilfield sources include functionality to create digital seismic files (e.g., digital seismic file (208)) in the data repository (210).

The oilfield sources are communicatively connected to the E&P computing system (204). The E&P computing system (204) include a data repository (210) and seismic data extraction software utility (212). The data repository (210) is any type of storage unit and/or device (e.g., a file system, database, collection of tables, or any other storage mechanism) for storing data. Further, the data repository (210) may include multiple different storage units and/or devices. The multiple different storage units and/or devices may or may not be of the same type or located at the same physical site.

The data repository (210) includes functionality to store a digital seismic file (208). A digital seismic file (208) includes seismic data stored in accordance with parameters (214) and a header (216). The seismic data (214) is data acquired through a seismic survey that is stored in the digital seismic file as known in the art. Seismic data (214) is stored in accordance with parameters (214). The parameters may not be expressly defined in the digital seismic file. Specifically, parameters may not be stored in the digital seismic file as parameter name, parameter value pairs. Rather, parameters may be interpreted from a matching template or extrapolated based on attributes of the seismic value.

The parameters of the seismic data store information about the content of the seismic data and acquisition technique rather than datatype, file format, and file metadata. By way of an example, the parameters include stacking parameters (e.g., pre-stack, post-stack), dimensions of seismic survey (e.g., two-dimensional, three-dimensional data captured), sorting code, the sort key (e.g., inline or crossline sort key), survey type, byte locations of the shot point location (SP) value/common depth point (CDP) value, and X and Y coordinates of the source (e.g., Sx and Sy byte offsets). The header (216) provides some parameters of the digital seismic file. Because of the heterogeneity of seismic acquisition tools, the location and the format of the headers in the various digital seismic files are also heterogeneous.

The data repository (210) also includes functionality to store a candidate template library (218) that includes candidate templates (220). The candidate template library (218) stores a collection of candidate templates (220). Candidate templates may not be defined for particular digital seismic files or data acquisition tools. By way of an example, candidate templates may be defined based on user experience. Rather, candidate templates are possible templates that, on their face, are equally applicable to the digital seismic files. Thus, determining which candidate template to apply is performed in one or more embodiments herein by testing the various candidate templates on the digital seismic file. One or more of the candidate templates may include various combinations of byte locations for at least some of the parameters. Specifically, the candidate template may identify a location in the digital seismic file where a particular parameter may be stored.

The data repository (210) is communicatively connected to a seismic data extraction software utility (212). The seismic data extraction software utility (212) is a software code (e.g., in a single program, a collection of programs, a software library) that is configured to automatically extract seismic data from the digital seismic file. The seismic data extraction software utility (212) includes a parameters extraction utility (222) and various components for extracting individual parameters. The parameters extraction utility (222) is configured to manage the extraction of individual parameters of digital seismic files. The parameter extraction utility (222) may be configured to process batches of digital seismic files and register parameters for each of the batches of digital seismic files. For example, a user may provide, to the parameter extraction utility, an identifier of a storage location of a collection of digital seismic files. The parameter extraction utility (222) may access the collection, individually extract parameters, and register the parameters with the corresponding digital seismic file.

The parameter extraction utility (222) may be connected to the various components that perform extraction of particular parameter types. For example, a stacking detector (224) may be configured to determine the stacking type of the digital seismic file (208). The number of dimensions detector (226) may be configured to determine the number of dimensions of the seismic data in the digital seismic file (208). The sort key detector (228) may be configured to determine the sorting type of the digital seismic file (208).

While FIG. 2 shows configurations of components, other configurations may be used without departing from the scope of the disclosure. For example, various components may be combined to create a single component. As another example, the functionality performed by a single component may be performed by two or more components.

FIGS. 3.1 and 3.2 shows flowcharts in accordance with one or more embodiments of the disclosure. FIG. 3.1 shows a flowchart for processing a digital seismic file. FIG. 3.2 shows a flowchart for performing autodetection of parameters. One or more of the blocks in FIGS. 3.1 and 3.2 may be performed by the components of the system (200)) discussed above in reference to FIG. 2. In one or more embodiments, one or more of the blocks shown in FIGS. 3.1 and 3.2 may be omitted, repeated, and/or performed in parallel, or in a different order than the order shown in FIGS. 3.1 and 3.2. Accordingly, the scope of the disclosure should not be considered limited to the specific arrangement of blocks shown in FIGS. 3.1 and 3.2.

At Block 301, a digital seismic file is obtained in one or more embodiments. Seismic surveying is performed in a field, and a digital seismic file is created and stored. Over time, many digital seismic files are saved in storage. The various digital seismic files may be disassociated with the tools used to create the digital seismic files. As such, opening the digital seismic file may be simply to see numbers without meaning of that which the numbers represent. In one or more embodiments, the parameter extraction utility is provided with a location of one or more digital seismic file. The parameter extraction utility accesses the location and opens the digital seismic file.

At Block 303, autodetection of parameters is performed. Performing autodetection of the parameters is described below with reference to FIG. 3.2.

Turning to FIG. 3.2, at Block 311, a target candidate template is obtained. The parameter extraction utility selects a candidate template from the candidate template library. The order of selection may be based, for example, on probabilistic selection based on candidate template that previously successfully extracted parameters. The candidate template that is currently being used to attempt to extract parameters is referred to as the target candidate template. Namely, the target candidate template is the candidate template that is actively being used to attempt parameter extraction. With parallel processing, multiple such targets may be used concurrently and in parallel to attempt extraction.

At Block 313, extraction of the binary header is attempted using the target candidate template. In one or more embodiments, the digital seismic file is a binary file. The binary header may be at a defined location in the digital seismic file. For example, the binary header may be a set of bytes starting at location X, where X is well defined. If not enough information is in the binary header, then the target candidate template is determined to be unable to extract the binary header. As another example, if all zeros are found, then the target candidate template may be determined to be unable to extract the binary header.

At Block 315, extraction of the trace header is attempted using the target candidate template. The trace header may be determined to be after the binary header. An attempt is made to extract the trace header according to the values in the target candidate template. For example, the target candidate template may specify the possible location of the trace header. The trace header may be around two hundred and forty bytes. Out of the two hundred and forty bytes, the SP or the CDPs or domain crossline values may be located in any of the two hundred and forty bytes. The target candidate template may be used to identify, in the two hundred and forty bytes, where each of the parameters may be found. If all zeros or less than a threshold amount of data is found in the trace header, then the target candidate template is determined to be unable to extract the trace header.

At Block 317, a determination is made whether the target candidate template successfully extracted headers. If the target candidate template did not successfully extract the binary header or the trace header, the process returns to Block 311 to try another target candidate template. If the target candidate template does extract the headers, then the process continues to Block 319.

At Block 319, parameters are attempted to be extracted using the candidate template. The target candidate template may specify byte locations of some of the parameters. In such a scenario, for each byte location identified, the value in the digital seismic file at the byte location is extracted. A determination is made whether the value matches a possible value for the parameter. If the value matches, then the parameter is assumed to be the value at the byte location. If the value at the byte location is not a possible value, then the probability of the target candidate template being a match is lowered.

Some parameters may be determined through statistical interpretation. For example, using inline and crossline trends, a determination is made whether the digital seismic file is three-dimensional or two-dimensional. If the digital seismic file is not three dimensional, then a determination may be made whether the digital seismic file is CDP sorted. If the digital seismic file is not CDP sorted, a test may be performed to check an SP step trend of the digital seismic file. If the digital seismic file has an SP step trend, then the parameters include the file being two dimensional and SP sorted. FIGS. 4.1 and 4.2 show a detailed flowchart for extracting parameters in accordance with one or more embodiments.

Continuing with FIG. 3.2, at Block 321, a determination is made whether the target candidate template successfully extracts the parameters. Successful extraction may be based on satisfying a threshold probability of being accurate. In particular, because at least some of the parameters are inferred, at least some of the parameters may have less than a hundred percent probability of being correct. Accordingly, extraction of a parameter may be associated with the probability. The cumulative probability of at least a subset of the parameters may be compared against the threshold probability. If the cumulative probability satisfies the threshold probability, then the target candidate template may be deemed to successfully extract parameters. Otherwise, the target candidate template may be deemed unsuccessful. If the target candidate template successfully extracts parameters, the flow may end. In some embodiments, the cumulative probabilities are compared across multiple target candidate templates. The target candidate template having the greatest cumulative probability may be selected.

If a target candidate template does not successfully extract the parameters, the flow may continue to the next target candidate template. The process may repeat for the various candidate template in the candidate template library until a matching candidate template is found that successfully extracts the parameters.

Returning to FIG. 3.1, at Block 305, parameters of the digital seismic file are registered with the digital seismic file. Registering the parameters includes storing identifiers of the parameters with the file and/or an identifier of the file. Namely, registering the parameters creates a stored association between the values of the parameters and the digital seismic file. For example, the parameter identifiers may be added to the metadata of the file. The parameter identifiers may be stored as parameter name, parameter value pairs. As another example, the parameter identifiers may be stored as a data structure of values, whereby the position of the values in the data structure identifies the parameter name of the parameter. Different techniques may be used to register the parameters of the digital seismic file with the digital seismic file. The various techniques may be used.

At Block 307, seismic data is extracted from the seismic files using the registered parameters. Using the parameters, individual seismic values are interpreted. Namely, based on the location of the individual seismic value in the seismic survey and the parameter, a software application can identify that which the value represents. Accordingly, the software application uses the seismic survey to analyze the underground formations.

FIGS. 4.1 and 4.2 show a detailed diagram to extract parameters from the digital seismic file. As shown in FIGS. 4.1 and 4.2, a target candidate template is selected from the candidate template library (402). The binary and trace headers are obtained (403). In each of the operations described below, the target candidate template is used to extract information from the binary file. Namely, the target candidate template is used in the operations below as if the target candidate template is accurate. For example, particular seismic values may be extracted for the operations below according to the target candidate template. A determination is made whether the SP, CDP, inline, and crossline values are constants (405) in the headers. If the SP, CDP, inline, and crossline values are detected as being constant values, then the current target candidate template is determined to be unsuccessful. The flow proceeds to move to the next target candidate template (407).

If the SP, CDP, inline, and crossline values are not all detected as being constants, then the system detects whether the source X and source Y values are both constants (409). If the source X and the source Y values are both constant values, then the current target candidate template is determined to be unsuccessful. The flow proceeds to move to the next target candidate template (407).

If the source X and the source Y values are not both constant values, the flow proceeds to check for step increase or decrease in block (411) and block (413). At block (411), a determination is performed whether the inline values form a step increase or a step decrease. If the inline values are detected as forming a step increase or a step decrease, then a determination is made whether the crossline values increase or decrease for each inline value (415). If the inline values are detected as forming a step increase or a step decrease (i.e., but not both), and the crossline values increase or decrease (i.e., but not both) for each inline value, then the flow proceeds to block (419) or block (421) based on whether some values are repeated. Namely, if no value is repeated, then the target candidate template is determined to be accurate and the seismic data is post-stacked (419). Specifically, a stacking parameter of the digital seismic file is post-stacked. Returning to block (415), if some crossline values repeat for each inline value, then the target candidate template is determined to be accurate and the seismic data is pre-stacked (421).

Returning to blocks (411) and (413), if the inline values do not form a step increase or decrease, then a determination is made whether the crossline values form a step increase or decrease (413). If the crossline values are detected as forming a step increase or a step decrease, then a determination is made whether the inline values increase or decrease for each crossline value (417). If the crossline values are detected as forming a step increase or a step decrease (i.e., but not both), and the inline values increase or decrease (i.e., but not both) for each crossline value, then the flow proceeds to block (419) or block (421) based on whether some values are repeated. Namely, if no value is repeated, then the target candidate template is determined to be accurate and the seismic data is post-stacked (419). Specifically, a stacking parameter of the digital seismic file is post-stacked. Returning to block (417), if some crossline values repeat for each inline value, then the target candidate template is determined to be accurate and the seismic data is pre-stacked (421).

At block (423), the spread of the source X and source Y values. If the spread of the source X and source Y values is detected as being linear within a tolerance (e.g., at least almost a line), then the file is determined to be three-dimensional. However, the parameter of the file being three-dimensional is with lower probability of being accurate. The flow may proceed to block (407) and the next target candidate template is selected. The target candidate template and the parameters in the previous operations may be saved. The level of extraction between target candidate templates may be compared.

Returning to block (423), if the spread of source X and source Y values satisfy a threshold area, then the seismic data in the digital seismic file is detected as being three-dimensional (427). The digital seismic file is detected as have a parameter of three-dimensional with a high confidence. Further, the determination may be made that the target candidate value is accurate. As such, the operations may stop.

Returning to block (413), if not of the previous templates conclude the digital seismic file to be three dimensional, then a determination is made whether the CDP values are continually increasing or decreasing (429). If the CDP values are continually increasing or decreasing (429), then a determination is made whether the CDP values are repeated. If no value of the CDP is detected as repeated, then a determination is made whether the SP values are continuously increasing or decreasing (431). If no value of the CDP is detected as repeated and the SP values are not detected as continuously increasing or decreasing, then the target candidate template is determined to be unsuccessful and the flow proceeds to block (407) to obtain the next target candidate template. If no value of the CDP is detected as repeated and the SP values are detected as continuously increasing or decreasing, then the target candidate template is determined to be correct. The parameter of the sort key is the CDP values, the survey type is tow-dimensional, and the seismic data is detected as being post-stacked at (433). The flow may proceed to block 407 to check another target candidate template.

Returning to block (429), if the CDP values are continuously increasing or decreasing and some of the CDP values are repeated, then a determination is made whether any of the previous templates identify the digital seismic file to be post-stacked. If the previous templates have not identified the file to be post-stacked, then a determination is made whether the SP values are detected to be continuously increasing or decreasing (435). If the SP values are not detected as continuously increasing or decreasing, then the target candidate template is determined to be unsuccessful.

If the SP values are detected as continuously increasing or decreasing, then a determination is made that the target candidate template is accurate, the source keys are detected as being the CDP values, and the data is detected as being post-stacked (437). The dimensions of the survey may be unknown when the flow proceeds to block (437). Other target candidate templates may be processed in one or more embodiments. If the conditions of block (431) and block (435) are not satisfied, the flow may return to block (407) to process the next target candidate template.

Returning to block (429), if the CDP values are not continually increasing or decreasing and none of the previous candidate templates determine that the digital seismic file is post-stacked, the flow proceeds to block (439) to determine whether the SP values form a step increase or decrease function. If the SP values are detected as not forming a step increase or decrease function in block (439), then the target candidate template is identified as correct. The sort keys are detected as the SP values and the seismic data is pre-stacked at block (441). The dimensions of the seismic data may be unknown.

The operations of FIGS. 4.1 and 4.2 may be repeated for at least a subset of the target candidate templates. The parameters and respective probabilities may be compared to identify the target candidate template that has the greatest probability of being accurate. The extracted parameters of the target candidate template that has the greatest probability of being accurate is selected.

FIGS. 5.1, 5.2, 5.3, 5.4, 5.5, 5.6, 5.7, 5.8, 5.9, 5.10, 5.11, 5.12, 5.13, 5.14, 5.15, 5.16, 5.17, and 5.18 shows an example in accordance with one or more embodiments of the disclosure.

One or more embodiments may be configured to extract parameters from a seismic SEG-Y file. The SEG-Y format file includes the sections shown in FIG. 5.1. One or more embodiments identify the parameters by scanning the headers of the file: EBCDIC, Binary and trace header. FIG. 5.2 shows an example template. The template has various combinations of byte locations for parameters, such as SP value, CDP value, INLINE or XLINE, X and Y coordinates.

Pre-stack and post-stacked are shown in FIGS. 5.3, 5.4, and 5.5. FIG. 5.3 shows an example of when pre-stacking and post-stacking of seismic data occurs in generating seismic data. As shown, pre-stacking is performed up to stacking and post-stacked data is after stacking. FIG. 5.4 shows a pre-stack seismic file having multiple traces at a point. FIG. 5.5 shows a post-stack file with a single trace at each point. As shown in a comparison of FIGS. 5.3 and 5.4, individual seismic values are not indicative of pre-stack versus post-stack. Similarly, only considering a small subset of seismic values does not indicate pre-stack or post-stack. Rather, the trends in the seismic values may be used to identify pre-stack and post-stack.

Values in the binary header may be used to interpret whether the seismic data in the digital seismic file is pre-stack or post-stack. For example, one or more embodiments may first check the binary header for data traces per record (e.g., as shown in FIGS. 5.6 and 5.7) and CDP fold (e.g., as shown in FIGS. 5.8 and 5.9). If the data traces per record in the binary header is greater than 1, the seismic data in the digital seismic file may be pre-stack. Thus, for example, the binary header shown in FIG. 5.6 may be for a digital seismic file that is pre-stack while the binary header shown in FIG. 5.7 is for a digital seismic file that is post-stack. Similarly, if the CDP fold value is greater than 1, the seismic data in the digital seismic file may be pre-stack. Thus, for example, the binary header shown in FIG. 5.9 may be for a digital seismic file that is pre-stack while the binary header shown in FIG. 5.8 is for a digital seismic file that is post-stack.

For some files, the binary header sometimes does not include the number of traces and/or the CDP fold. Thus, the seismic data extraction software utility may examine the trace headers. FIG. 5.10 is an example of a three-dimensional pre-stack file, which has duplicate inline values (e.g., inline values in column on right (520)).

Another parameter is a sorting parameter. Example sorting parameters may be that the seismic data is CMP sorted or SP sorted. A collection of the traces coming from source-receiver combinations that have the common midpoint is called a common midpoint or CMP gather. If multiple sources and receivers are used and the spacing between the sources and receivers is set up correctly more than one source receiver pair will have the same midpoint. This means that several reflections are obtained from the same subsurface location. FIG. 5.11 shows an example of CMP sorted.

A collection of traces coming from source-receiver combinations that have the common Shot Point (e.g., source) is called Shot Point sorting or SP sorting. FIG. 5.12 shows an example of SP sorting.

To determine whether a digital seismic file is SP or CDP sorted, one or more embodiments determine the sort key on the basis of linear increment or decrement of the CDP numbers with respect to the trace numbers in a two-dimensional file (e.g., as shown in the graph of FIG. 5.13). As another example, one or more embodiments may check for properties in the binary header. FIG. 5.14 shows a chart of codes, where a code in the binary header matching a code in the chart may indicate the sort key.

As shown above, in case of two-dimensional acquisition, a single receiver line records the reflected energy from the earth's surface. For three-dimensional seismic data, inline or crossline sorting may be used. In a case of three-dimensional, an array of shot and receiver points are used for acquiring subsurface information. An array of receivers records the reflected energy from the earth's surface. FIG. 5.15 compares an inline and crossline sorting. The seismic line within a 3D survey is parallel to the direction in which the seismic data was acquired. Whereas, as shown in FIG. 5.15, a seismic line within a 3D survey is perpendicular to the direction in which the seismic data was acquired. Notably, for marine, inline and crossline definitions are different than for land shown in FIG. 5.15.

In order to determine whether a digital seismic file is in-line or crossline sorted, one or more embodiments analyze the arrangement of trace headers. A three-dimensional, post-stack digital seismic file may be in-line sorted if a step increment or decrement of inline numbers with respect to the trace numbers exists. If the post-stack seismic data is inline sorted, the crosslines would increase or decrease linearly for each inline sorted record. A similar logic may be applied to crossline sorted datasets.

Another parameter is whether the survey type is two-dimensional or three dimensional. The survey type of the file is inferred from the sort key identified from the file. FIG. 5.16 shows a table mapping the survey type to the possible sort keys and stacking parameter. The survey type may also be inferred from the X and Y coordinates and CRS. Generally, X and Y coordinates may be located in the following byte locations: 73-76 for Source X, 77-80 for Source Y, 81-84 for GX, 85-88 for GY, 181-184 for CDP-X, and 185-188 for CDP-Y. The X coordinate may have a maximum of six integers whereas Y coordinate may have a maximum of seven integers. A negative XY scalar should be present in byte location 71 if the maximum limit is exceeded. Keywords in the EBCDIC header may be used to identify the CRS. For example, EPSG may be indicative of the CRS.

Quality of the digital seismic file and parameter extraction from the digital seismic file may be determined. One or more embodiments generate a quality score to the digital seismic file based on the parameters that are determined. If the various parameters identified above are detected, then the file is good quality. Additionally, in order to determine the x and y quality, the algorithm performs a PCA (principal component analysis) to validate the spread of X and Y. On running the algorithm, a 3D file should have an X and Y spread similar to FIG. 5.17. The ratio of first component to second component should be less than 0.9. In the case of two dimensional, shown in FIG. 5.18, the ratio should be greater than 0.9.

Quality of the digital seismic file is decreased in the case of the digital seismic file not being machine readable, the binary and/or trace header missing, or missing values or unexpected values in the trace headers. By way of an example of a missing or unexpected value, for a 2D SEG-Y file, it is expected that the values for SP or CDP could be either increasing or decreasing. One or more embodiments compares every trace header value to ensure that the values are consistent. If zeros or breaks are found in the SP or CDP values, an alert is generated and presented to indicate that the quality of the digital seismic file is reduced.

Embodiments of the disclosure may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (622) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (620), such as a touchscreen, keyboard, mouse, microphone, touchpad, electronic pen, or any other type of input device.

The communication interface (622) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform at least a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
   obtaining a digital seismic file;
   performing autodetection of a plurality of parameters of the digital seismic file, wherein performing autodetection comprises a computer processor repetitively at least until a candidate template successfully extracts the plurality of parameters:
   selecting a target candidate template,
   attempting extraction of a binary header using the target candidate template,
   attempting extraction of a trace header using the target candidate template,
   attempting extraction of the plurality of parameters when the target candidate template extracts the binary header and the trace header, and
   moving to a next target candidate template when extraction of the plurality of headers is unsuccessful; and
   registering the plurality of parameters of the digital seismic file with the digital seismic file.

2. The method of claim 1, wherein attempting extraction of the plurality of parameters comprises:
   detecting whether shot point (SP) value, common depth point (CDP) value, inline value, and crossline value in the digital seismic file are constant values;
   detecting whether a source X value and a source Y value in the digital seismic file are both constant values; and
   determining that the target candidate template is unsuccessful if at least one selected from the group consisting of the SP value, CDP value, inline value, and crossline value are constant values and the source X value and the source Y value are both constant values.

3. The method of claim 1, wherein attempting extraction of the plurality of parameters comprises:
   detecting that a plurality inline values form a step increase or step decrease;
   detecting that a plurality of crossline values increases or decreases for each inline value of the plurality of inline values;
   detecting that seismic data in the digital seismic file is post stacked when a crossline value of the plurality of crossline values is not repeated.

4. The method of claim 1, wherein attempting extraction of the plurality of parameters comprises:
   detecting that a plurality inline values form a step increase or step decrease;
   detecting that a plurality of crossline values increases or decreases for each inline value of the plurality of inline values;
   detecting that seismic data in the digital seismic file is pre-stacked when a crossline value of the plurality of crossline values is repeated.

5. The method of claim 1, wherein attempting extraction of the plurality of parameters comprises:

detecting that a plurality crossline values form a step increase or step decrease;
detecting that a plurality of inline values increases or decreases for each crossline value of the plurality of crossline values;
detecting that seismic data in the digital seismic file is post stacked when an inline value of the plurality of inline values is not repeated.

6. The method of claim 1, wherein attempting extraction of the plurality of parameters comprises:
detecting that a plurality crossline values form a step increase or step decrease,
detecting that a plurality of inline values increases or decreases for each crossline value of the plurality of crossline values, and
detecting that seismic data in the digital seismic file is pre-stacked when an inline value of the plurality of inline values is repeated.

7. The method of claim 1, wherein attempting extraction of the plurality of parameters comprises:
detecting a failure of the target candidate template when a first set of values form a step increase or decrease and a second set of values fail to increase or decrease for each value in the first set of values,
wherein the first set of value and the second set of values are a plurality of inline values and a plurality of crossline values.

8. The method of claim 1, wherein attempting extraction of the plurality of parameters comprises:
detecting a spread of a plurality of source X values and a plurality of source Y values, and
based on a spread satisfying a threshold area, determining that seismic data in the digital seismic file is a three-dimensional file.

9. The method of claim 1, wherein attempting extraction of the plurality of parameters comprises:
detecting a spread of a plurality of source X values and a plurality of source Y values, and
based on a spread being linear within a tolerance, detecting a failure of the target candidate template to extract the plurality of parameters.

10. The method of claim 1, wherein attempting extraction of the plurality of parameters comprises:
detecting that a plurality of CDP values is continually increasing or decreasing,
detecting a uniqueness of the plurality of CDP values,
detecting that a plurality of SP values is continually increasing or decreasing,
identifying, based on the determination the plurality of CDP values is continually increasing or decreasing, the uniqueness, and that the plurality of SP values is continually increasing or decreasing, the plurality of parameters as comprising:
a plurality of sort keys being the plurality of CDP values,
a survey type being two-dimensional, and
seismic data being post-stacked.

11. The method of claim 1, wherein attempting extraction of the plurality of parameters comprises:
detecting that a plurality of CDP values is continually increasing or decreasing,
detecting a lack of uniqueness of the plurality of CDP values,
determining that a prior target candidate template failed to identify seismic data to be post-stacked,
detecting that a plurality of SP values is continually increasing or decreasing,
identifying, based on the determination the plurality of CDP values is continually increasing or decreasing, the lack of uniqueness, the prior target candidate template failing to identify the seismic data as post-stacked, and that the plurality of SP values is continually increasing or decreasing, the plurality of parameters as comprising:
a plurality of sort keys being the plurality of CDP values, and
seismic data being post-stacked.

12. The method of claim 1, wherein attempting extraction of the plurality of parameters comprises:
detecting that a plurality of CDP values is not continually increasing or decreasing,
detecting that a plurality of SP values forms a step increase or decrease function,
identifying, based on the determination the plurality of CDP values is not continually increasing or decreasing, and that the plurality of SP values is continually increasing or decreasing, the plurality of parameters as comprising:
a plurality of sort keys being the plurality of SP values, and
seismic data being pre-stacked.

13. A system comprising:
memory; and
a processor for executing computer readable code configured to perform operations comprising:
obtaining a digital seismic file;
performing autodetection of a plurality of parameters of the digital seismic file, wherein performing autodetection comprises a computer processor repetitively at least until a candidate template successfully extracts the plurality of parameters:
selecting a target candidate template,
attempting extraction of a binary header using the target candidate template,
attempting extraction of a trace header using the target candidate template,
attempting extraction of the plurality of parameters when the target candidate template extracts the binary header and the trace header, and
moving to a next target candidate template when extraction of the plurality of headers is unsuccessful; and
registering the plurality of parameters of the digital seismic file with the digital seismic file.

14. The system of claim 13, wherein attempting extraction of the plurality of parameters comprises:
detecting whether SP value, CDP value, inline value, and crossline value in the digital seismic file are constant values
detecting whether a source X value and a source Y value in the digital seismic file are both constant values
determining that the target candidate template is unsuccessful if at least one selected from the group consisting of the SP value, CDP value, inline value, and crossline value are constant values and the source X value and the source Y value are both constant values.

15. The system of claim 13, wherein attempting extraction of the plurality of parameters comprises:
detecting that a plurality inline values form a step increase or step decrease;
detecting that a plurality of crossline values increases or decreases for each inline value of the plurality of inline values;

detecting that seismic data in the digital seismic file is post stacked when a crossline value of the plurality of crossline values is not repeated.

16. The system of claim 13, wherein attempting extraction of the plurality of parameters comprises:
   detecting that a plurality inline values form a step increase or step decrease;
   detecting that a plurality of crossline values increases or decreases for each inline value of the plurality of inline values;
   detecting that seismic data in the digital seismic file is pre-stacked when a crossline value of the plurality of crossline values is repeated.

17. A non-transitory computer readable medium comprising instructions that, when executed by a computer processor, perform operations comprising:
   obtaining a digital seismic file;
   performing autodetection of a plurality of parameters of the digital seismic file, wherein performing autodetection comprises a computer processor repetitively at least until a candidate template successfully extracts the plurality of parameters:
      selecting a target candidate template,
      attempting extraction of a binary header using the target candidate template,
      attempting extraction of a trace header using the target candidate template,
      attempting extraction of the plurality of parameters when the target candidate template extracts the binary header and the trace header, and
      moving to a next target candidate template when extraction of the plurality of headers is unsuccessful; and
   registering the plurality of parameters of the digital seismic file with the digital seismic file.

18. The non-transitory computer readable medium of claim 17, wherein attempting extraction of the plurality of parameters comprises:
   detecting whether SP value, CDP value, inline value, and crossline value in the digital seismic file are constant values
   detecting whether a source X value and a source Y value in the digital seismic file are both constant values
   determining that the target candidate template is unsuccessful if at least one selected from the group consisting of the SP value, CDP value, inline value, and crossline value are constant values and the source X value and the source Y value are both constant values.

19. The non-transitory computer readable medium of claim 17, wherein attempting extraction of the plurality of parameters comprises:
   detecting that a plurality inline values form a step increase or step decrease;
   detecting that a plurality of crossline values increases or decreases for each inline value of the plurality of inline values;
   detecting that seismic data in the digital seismic file is post stacked when a crossline value of the plurality of crossline values is not repeated.

20. The non-transitory computer readable medium of claim 17, wherein attempting extraction of the plurality of parameters comprises:
   detecting that a plurality inline values form a step increase or step decrease;
   detecting that a plurality of crossline values increases or decreases for each inline value of the plurality of inline values;
   detecting that seismic data in the digital seismic file is pre-stacked when a crossline value of the plurality of crossline values is repeated.

* * * * *